(12) United States Patent
Rinear et al.

(10) Patent No.: US 10,752,403 B1
(45) Date of Patent: Aug. 25, 2020

(54) VEHICLE BOX ORGANIZER

(71) Applicants: Dennis Rinear, Hanson, ID (US);
Dennis D. Rinear, North Las Vegas, NV (US); Robert Lee, Tulsa, OK (US);
Constantino Velez, North Las Vegas, NV (US)

(72) Inventors: Dennis Rinear, Hanson, ID (US);
Dennis D. Rinear, North Las Vegas, NV (US); Robert Lee, Tulsa, OK (US);
Constantino Velez, North Las Vegas, NV (US)

( * ) Notice: Subject to any disclaimer, the term of this patent is extended or adjusted under 35 U.S.C. 154(b) by 0 days.

(21) Appl. No.: 16/421,023

(22) Filed: May 23, 2019

Related U.S. Application Data

(60) Provisional application No. 62/675,336, filed on May 23, 2018.

(51) Int. Cl.
| | | |
|---|---|---|
| *F21V 33/00* | (2006.01) | |
| *B65D 25/06* | (2006.01) | |
| *B65D 43/16* | (2006.01) | |
| *B65D 51/24* | (2006.01) | |
| *B65D 55/02* | (2006.01) | |
| *B60R 11/00* | (2006.01) | |
| *B65D 25/28* | (2006.01) | |

(52) U.S. Cl.
CPC .............. *B65D 25/06* (2013.01); *B60R 11/00* (2013.01); *B65D 25/2838* (2013.01); *B65D 43/163* (2013.01); *B65D 51/248* (2013.01); *B65D 55/02* (2013.01); *B60R 2011/0003* (2013.01)

(58) Field of Classification Search
CPC .... B65D 85/109; A45C 15/06; F21V 33/0084
USPC ........................................................ 362/154
See application file for complete search history.

(56) References Cited

U.S. PATENT DOCUMENTS

| | | | |
|---|---|---|---|
| 4,844,305 A | 7/1989 | McKneely | |
| 5,597,113 A | 1/1997 | Bradford | |
| 5,634,577 A | 6/1997 | Pearson, Jr. et al. | |
| 7,984,820 B2 | 7/2011 | Dancyger | |
| 2008/0128428 A1 | 6/2008 | Beckerman | |
| 2010/0052490 A1 | 3/2010 | Harrison | |
| 2013/0033854 A1* | 2/2013 | Statham | F25D 27/00 362/154 |
| 2013/0128560 A1* | 5/2013 | Werner | B65D 85/00 362/154 |
| 2016/0010845 A1* | 1/2016 | Brown | F25D 3/08 362/551 |

* cited by examiner

*Primary Examiner* — Matthew J. Peerce
(74) *Attorney, Agent, or Firm* — Cramer Patent & Design, PLLC; Aaron R. Cramer

(57) ABSTRACT

A storage box having organizational inserts is capable of being stored within a side box of a cab of a tractor trailer. The inserts are configurable and modular. Certain embodiments include illumination means on the exterior of the storage box and the interior of the storage box. Other certain embodiments include a split lid.

19 Claims, 6 Drawing Sheets

VEHICLE BOX ORGANIZER

RELATED APPLICATIONS

The present invention claims the benefit of U.S. provisional application Ser. No. 62/675,336, filed May 23, 2018, the entire disclosures of which are incorporated herein by reference.

FIELD OF THE INVENTION

The present invention relates to an organizer for a storage box associated with tractor trailer vehicles.

BACKGROUND OF THE INVENTION

Tractor trailers are a ubiquitous vehicle on roadways in the modern era. For transporting large amounts of goods to many different locations, tractor trailers are very efficient to transport such goods across countries and states to many different locations that aircraft, trains, or watercraft cannot go. A single tractor trailer can carry multiple loads for delivery to multiple locations.

The cab of a tractor trailer usually has a side box that is accessible along the side of the cab, typically aft of the door and can be on either side. They are typically used to carry items commonly used in vehicular operation. These side boxes are secured usually with a lid, but once opened, are accessible by an authorized user. Typically, these side boxes are merely empty vessels for anything to be put in there, and during travel can easily spill or be jostled and suffer damage. Jostled items can easily open the lid, thereby causing equipment damage or being unintentionally jettisoned during vehicular travel. This creates a safety hazard.

Also, during travel, items can be pinned against the rear of the side box and be very difficult to retrieve. Therefore, it is a benefit to have a side box incorporating an organizer that fits within the side box. Such an organizer is preferably mounted on bearings to enable easy grasping and removal from the side box. The organizer for a storage box associated with tractor trailer vehicles fulfills this need.

SUMMARY OF THE INVENTION

The inventor has recognized the aforementioned inherent problems and lack in the art and observed that there is a need for a storage box which comprises a generally rectangular unit having a first sidewall and a second sidewall. The first sidewall and the second sidewall are parallel to each other and are attached at a plurality of opposing bottom edges each with a bottom wall. The first sidewall and the second sidewall are attached at opposing rear edges with a rear wall, and the first sidewall and the second sidewall are attached at a plurality of opposing front edges with a front wall. Each of the sidewalls has a handle located along a bisecting vertical centerline and adjacent top edges.

The storage box also comprises one or more lids having a rear edge pivotally attached to a top edge of the rear wall with a hinge. The hinge biases the lid to be fully closed with respect to the storage box. The storage box also comprises a torsion spring utilized to bias the lid closed, a plurality of clips which are affixed to the inner surfaces of the front wall and the rear wall of the interior of the storage box, a pair of rails each of which are attached to the bottom wall and equidistantly spaced from a bisecting longitudinal centerline. The pair of rails are coextensive with the length of the bottom wall. The storage box also comprises a plurality of bearings securely retained within a respective rail. The bearings are capable of independent rotation within the respective rail. The rails function as a race for the respective bearings such that the bearing rotates independently therein the respective rail, while being captured therein.

The storage box also comprises at least one first lamp each of which are mounted to an interior surface of the lid. The at least first lamp is mounted in a position to provide first illumination to the interior of the storage box and at least one second lamp each of which is mounted to an exterior surface of the storage box. Each of the at least one second lamp is mounted to provide second illumination away from the storage box.

The generally rectangular unit may have a plurality of slightly rounded corners. The handles may be hinged into the respective sidewall. The hinge may comprise a living hinge. The hinge may also be a piano hinge. Along a front center perimeter edge of the lid may be a latch that correspondingly aligns with and mates with a catch located on the front wall adjacent the top edge thereof. The latch and the catch may enable a locking device to be secured thereto, thereby locking the lid to the storage box and prevent unauthorized access to the interior. The lid may include a slightly larger perimeter than the bottom portion of the storage to enable the lid to be grasped and manipulated. The storage box may further comprise a weatherproof gasket located on the bottom perimeter of the lid to maintain a seal from one or more items stored in the interior from the elements. The clips may be affixed to the inner surfaces of each sidewall. The clips may be a resilient spring clip capable of being slightly deformed. The clips may be provided in an aligned pair while the aligned clips may be capable of enabling a divider to be removably placed therein.

The divider may be sized to span a distance between the inner surfaces of the sidewalls to span between inner surfaces of the front wall and the rear wall. The rails may be affixed to the bottom wall. The bearings may be a plurality of stainless ball bearings or may comprise a plurality of plastic spheres with low coefficient of friction. The at least one second lamp may be a red continuous light to alert that the storage box is present for safety purposes. The at least one second lamp is a flashing light to alert that the storage box is present for safety purposes.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
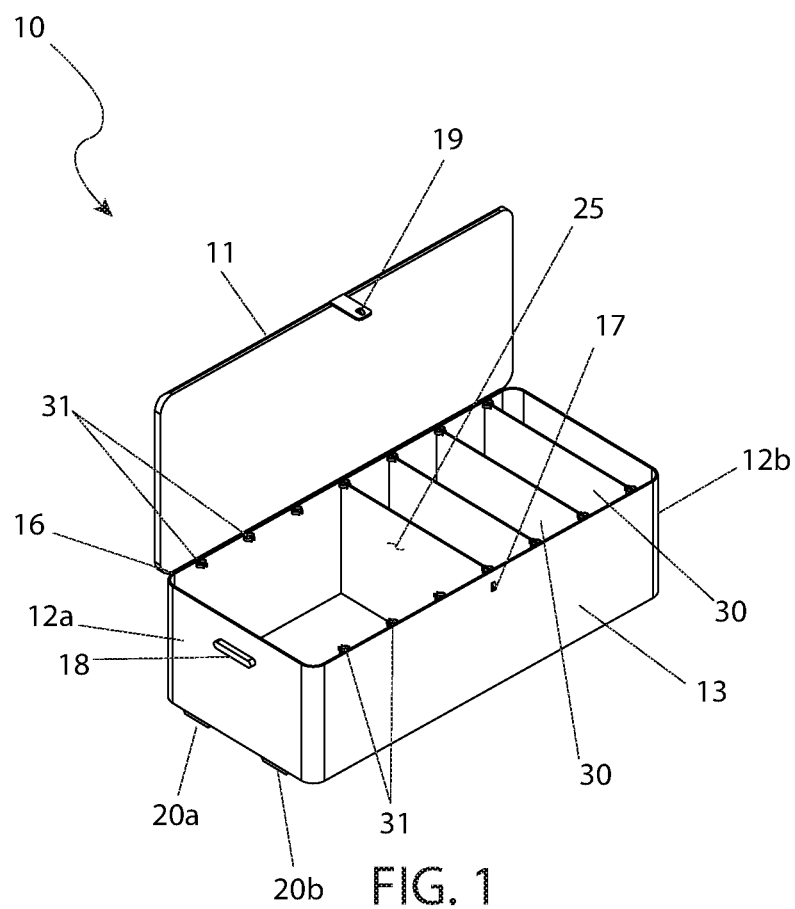
FIG. 1 is a perspective top view of a storage box 10 with a lid 11 in an open configuration, according to a preferred embodiment of the present invention.

DESCRIPTIVE KEY 10 storage box
11 lid
12a first sidewall
12b second sidewall
13 front wall
14 rear wall
15 bottom wall
16 hinge
17 catch
18 handle
19 latch
20a first rail
20b second rail
21a first bearing
21b second bearing
25 interior
30 divider
31 clip
40 first lamp
41 first illumination
45 second lamp
46 second illumination
50a first lid
50b second lid
51a first lid latch
51b second lid latch
52a first lid catch
52b second lid catch
56a first hinge
56b second hinge
60 cab
61 compartment
62 compartment door

1. DESCRIPTION OF THE INVENTION

The best mode for carrying out the invention is presented in terms of its preferred embodiment, herein depicted within FIG. 1. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

Figure 3:
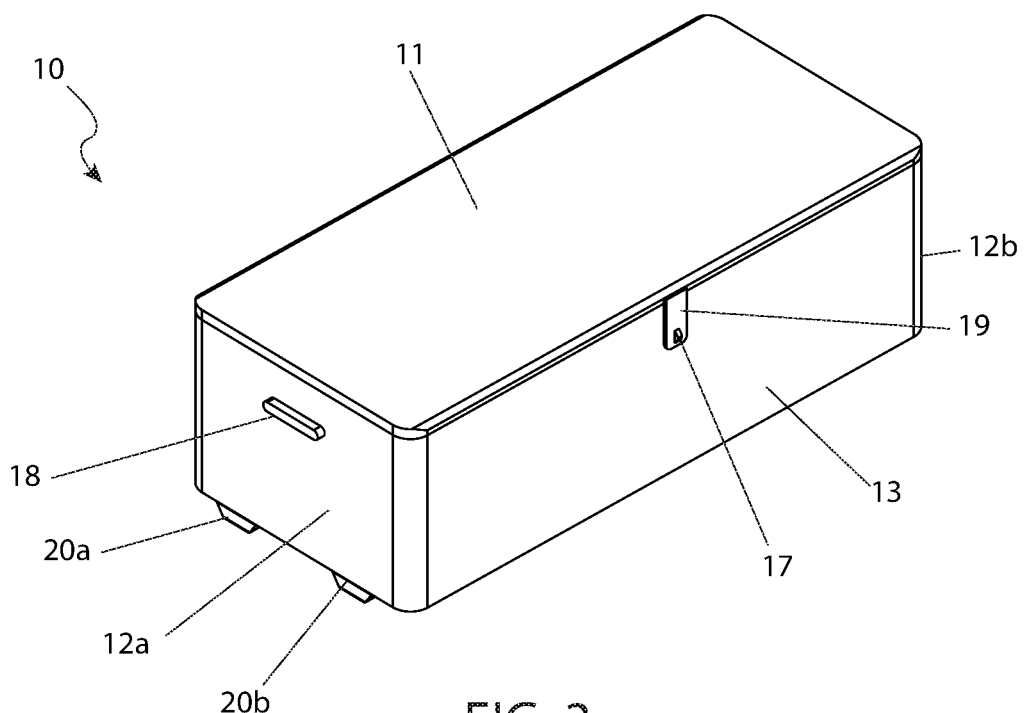
FIG. 3 is a perspective top view of a storage box 10 with a lid 11 in a closed configuration, according to the preferred embodiment of the present invention.
Figure 10:
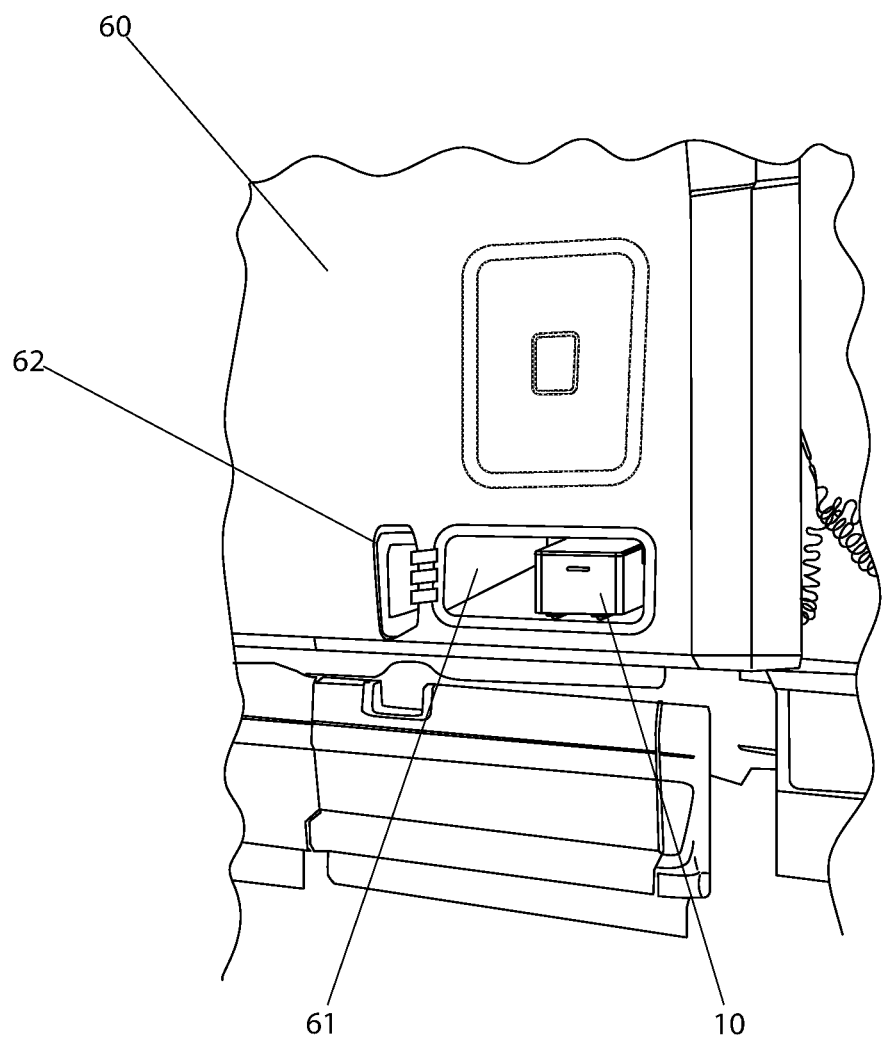

FIGS. 1 and 3 disclose a front perspective view of the storage box 10. FIG. 10 illustrates the preferred placement of the storage box 10. The storage box 10 is envisioned to be held within a storage compartment 61 on the side of a cab 60 of a tractor trailer. Such storage compartments 61 are typically referred to as side boxes 31. The side box 61 typically has five (5) closed sides and one (1) open side having a securable compartment door 62, accessible from the side of the cab 60. The storage box 10 is sized to wholly fit within this side box 61. It is preferred that the storage box 10 is a resilient, weatherproof, and hardy material of construction, such as stainless steel, rubber, or plastic.

The storage box 10 in its preferred configuration includes a generally rectangular unit with slightly rounded corners. A first sidewall 12a and a second sidewall 12b are parallel to each other and are attached at opposing bottom edges with a bottom wall 15, attached at opposing rear edges with a rear wall 14, and attached at opposing front edges with a front wall 13. Each sidewall 12a, 12b has a handle 18 located along a bisecting vertical centerline and adjacent top edges thereof. The handles 18 may be hinged or molded into the respective sidewall 12a, 12b. A lid 11 has a rear edge pivotally attached to a top edge of the rear wall 14 with a hinge 16. The hinge 16 may be a living hinge or a piano hinge and biases the lid 11 to be fully closed with respect to the storage box 10. A torsion spring may also be utilized to bias the lid 11 closed. Along the front center perimeter edge of the lid 11 is a latch 19 that correspondingly aligns with and mates with a catch 17 located on the front wall 13 adjacent the top edge thereof. The latch 19 and catch 17 may enable a locking device to be secured thereto, thereby locking the lid 11 to the storage box 10 and prevent unauthorized access to the interior 25. The lid 11 may have a slightly larger perimeter than the bottom portion of the storage box 10 (i.e., the perimeter of the first sidewall 12a, second sidewall 12b, front wall 13, and rear wall 14) to enable the lid 11 to be grasped and manipulated. There also may be waterproof and weatherproof gasket located on the bottom perimeter of the lid 11 or the upper perimeter of the bottom of the storage box 10 (i.e., the first sidewall 12a, second sidewall 12b, front wall 13, and rear wall 14) to maintain a seal from items stored in the interior 25 from the elements.

Figure 2:
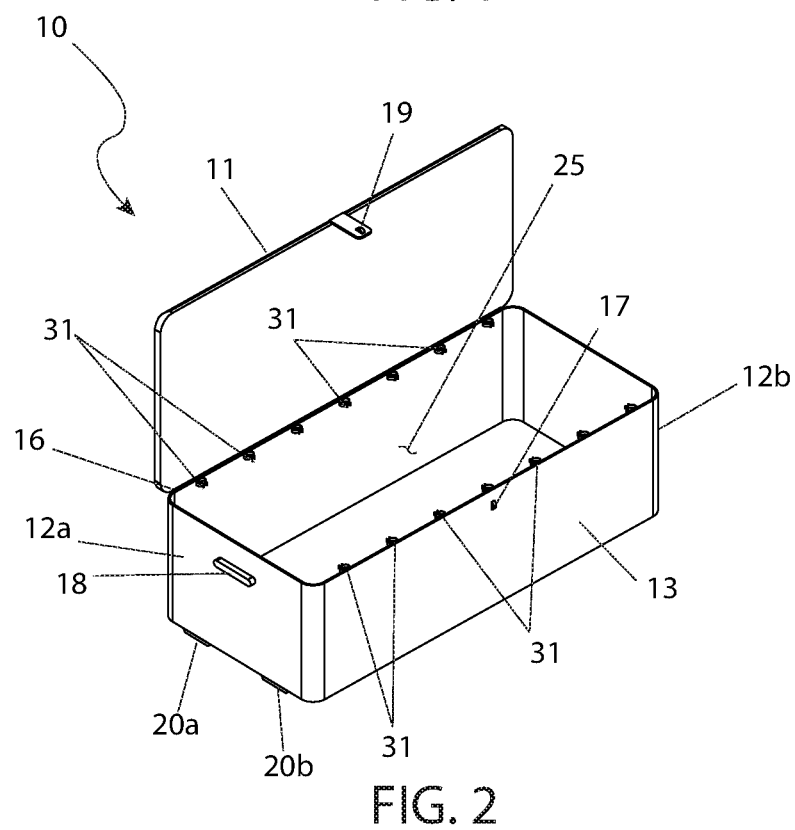
FIG. 2 is a perspective top view of a storage box 10 with a lid 11 in an open configuration with the dividers 30 removed, according to a preferred embodiment of the present invention.
Figure 5:
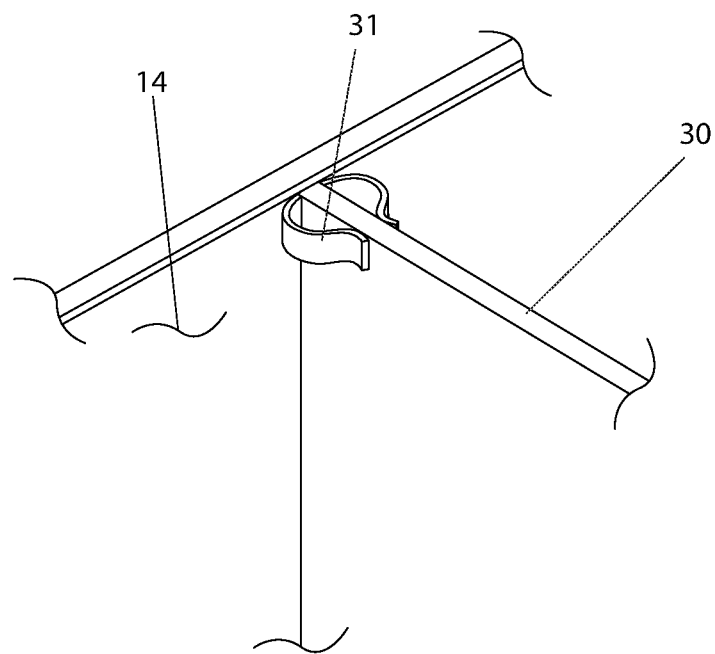
FIG. 5 is a close-up perspective view of a divider 30 retained within the storage box 10 with a clip 31, according to a preferred embodiment of the present invention.

FIG. 2 illustrates the interior 25 of the storage box 10. Within the interior 25 of the storage box 10 there are a plurality of clips 31, each affixed to the inner surfaces of the front wall 13 and rear wall 14. Alternately, the clips 31 can be affixed to inner surfaces of each sidewall 12a, 12b. Each clip 31 is preferably a resilient spring clip capable of being slightly deformable. Each clip 31 can be affixed, removably attached, or an integrally formed portion of the storage box 10. The plurality of clips 31 are provided in aligned pairs; as such, one (1) clip 31 is affixed to the front wall 13 and one (1) clip is affixed to the rear wall 14, or in the alternate embodiment, one (1) clip 31 is affixed to the first sidewall 12a and one (1) clip is affixed to the second sidewall 12b. The aligned clips 13 are capable of enabling a divider 30 to be removably placed therein, as can be seen more clearly in FIG. 5. The dividers 30 can be sized to span the distance between inner surfaces of the sidewalls 12a, 12b, to span the distance between inner surfaces of the front wall 13 and rear wall 14, or to span the distance between adjacent dividers 30.

Figure 4:
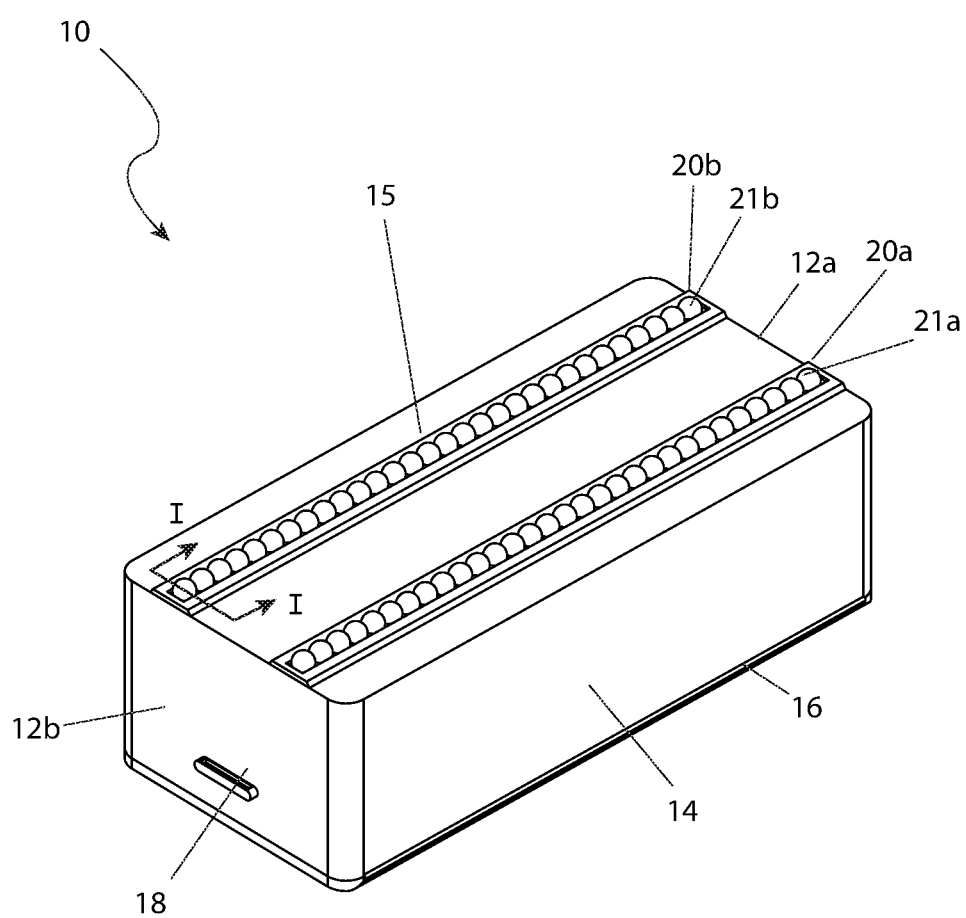
FIG. 4 is a perspective bottom view of the storage box 10, according to the preferred embodiment of the present invention.
Figure 6:
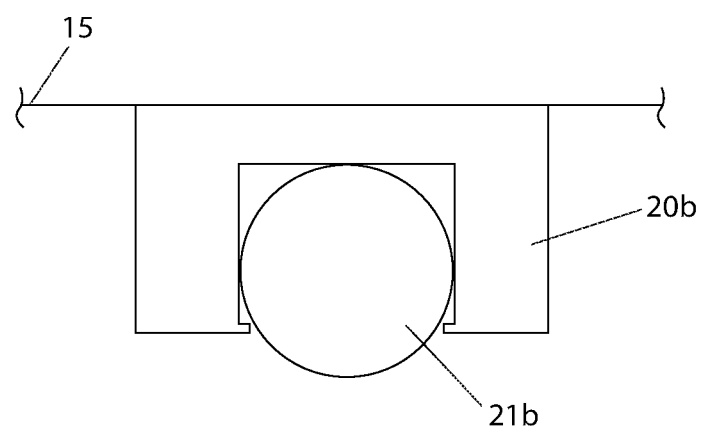
FIG. 6 is a sectional view of a second rail 20b along the I-I (as seen in FIG. 4), according to a preferred embodiment of the present invention.

FIG. 4 illustrates the bottom perspective view of the storage box 10, showing a pair of rails 20a, 20b each attached to the bottom wall 15 and equidistantly spaced from a bisecting longitudinal centerline. The rails 20a, 20b may be coextensive with the length of the bottom wall 15. Securely retained within a respective rail 20a, 20b is a plurality of bearings 21a, 21b, which can be stainless ball bearings, plastic spheres with low coefficient of friction, or similar materials. A clearer illustration of the relationship of each bearing 21b within the second rail 20b is illustrated in FIG. 6, although it is appreciated that the relationship between each first bearing 21a within the first rail 20b is identical. The bearings 21a, 21b are capable of independent rotation within the respective rail 20a, 20b. The rails 20a, 20b can be affixed to the bottom wall 15 or a molded portion thereof. The bottom of each bearing 21a, 21b is partially exposed outside of the respective rail 20a, 20b, such that they can contact the upper surface of the bottom wall of the storage box cavity and be easily removable therefrom. The rails 20a, 20b function as a race for the respective plurality of bearings 21a, 21b, such that the bearings 21a, 21b, rotate independently therein the respective rail 20a, 20b, while being captured therein. The bottom of each bearing 21a, 21b is capable of contacting an exterior surface (e.g., the bottom wall of the side box 61) to enable the storage box 10 to roll on the exterior surface.

Figure 7:
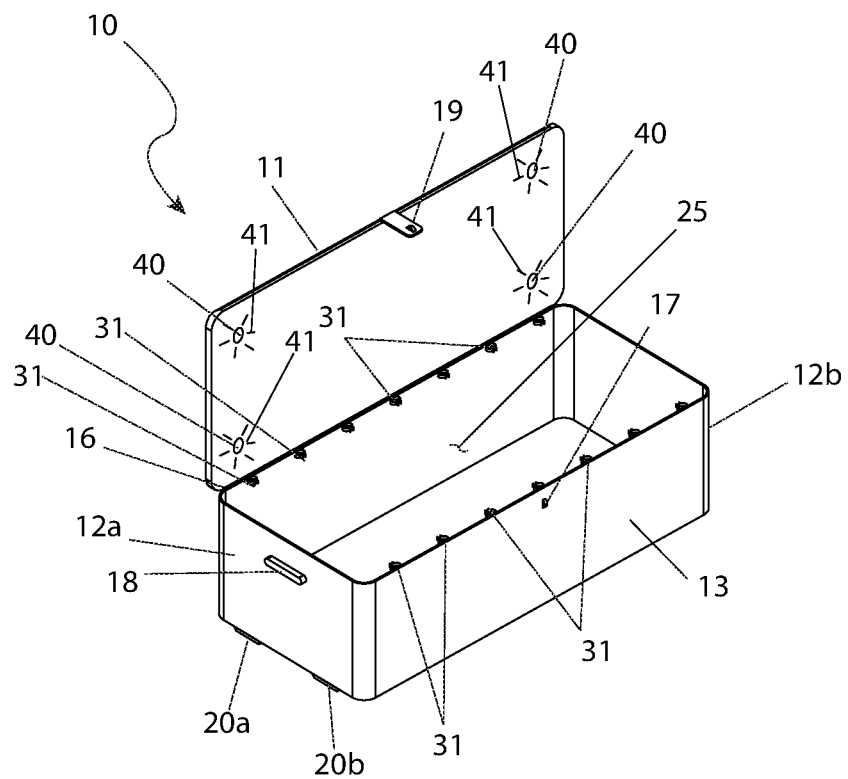
FIG. 7 is a perspective top view of the storage box 10 with a lid 11 in an open configuration depicting a plurality of first lamps 40, according to an alternate embodiment of the present invention.

FIG. 7 illustrates an alternate embodiment of the storage box 10, wherein there is at least one (1) first lamp 40, each mounted to an interior surface of the lid 11. The first lamp 40 may be mounted in a position to best provide first illumination 41 to the interior 25 of the storage box 10. There may be multiple first lamps 40 as required to provide the desired first illumination 41. The first lamps 40 are in electrical communication with a power source and a switch (not shown). In some embodiments, the switch may be activated upon opening the lid 41.

Figure 8:
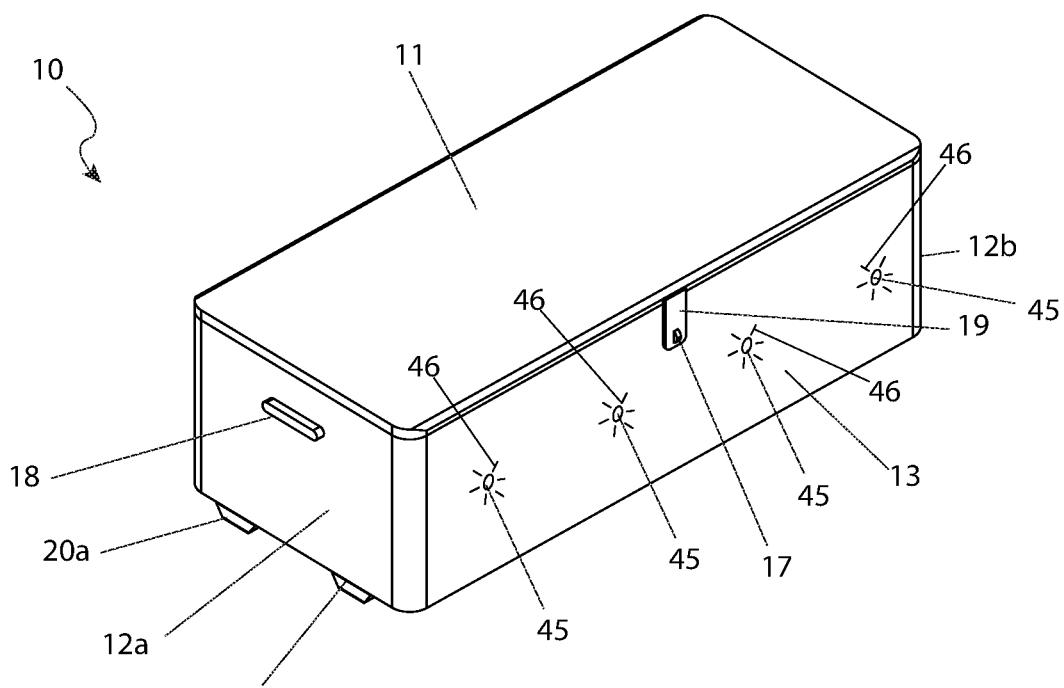
FIG. 8 is a perspective top view of a storage box 10 with a lid 11 in a closed configuration depicting a plurality of second lamps 45, according to another alternate embodiment of the present invention.

FIG. 8 illustrates another alternate embodiment of the storage box 10, wherein there is at least one (1) second lamp 45, each mounted to an exterior surface of storage box 10. In the exemplary embodiment, this exterior surface is the front wall 13, but is understood that any of the exterior side walls (i.e., first sidewall 12a, second sidewall 12b, front wall 13, and rear wall 14) or any combination thereof, fall under the scope of the invention. Each second lamp 45 may be equidistantly spaced and coaligned or otherwise oriented. Each second lamp 45 may be mounted in a position to best provide second illumination 46 away from the storage box 10. There may be multiple second lamps 45 as required to provide the desired second illumination 46. In the exemplary embodiment, the second illumination 46 is a red continuous or flashing light to alert other motorists or outside individuals that the storage box 10 is present for safety purposes. The second lamps 45 are in electrical communication with a power source and a switch (not shown). In some embodiments, the switch may be activated upon opening the lid 41.

Figure 9:
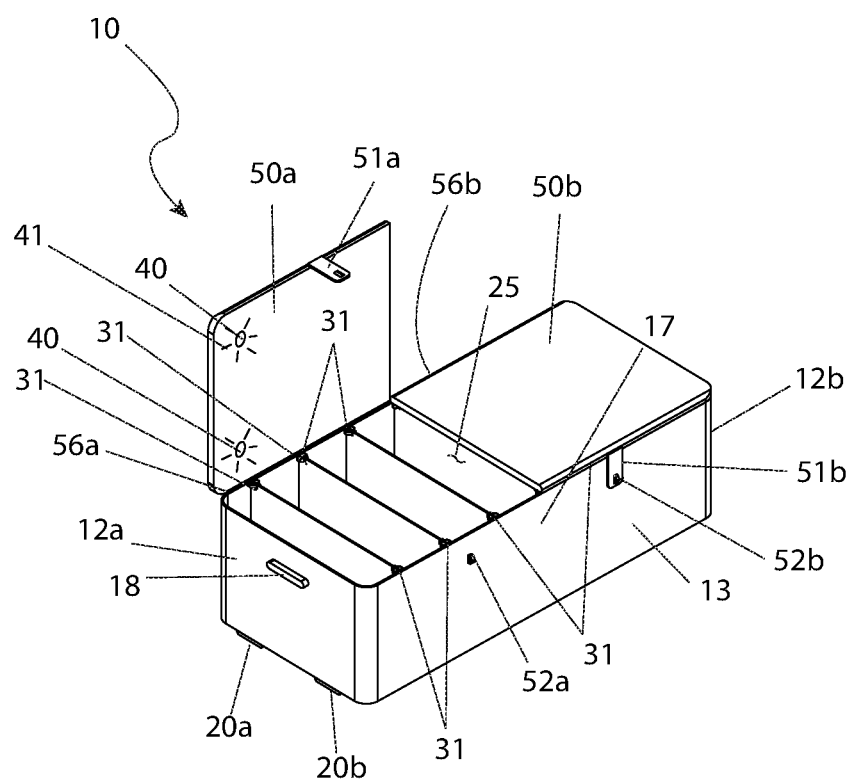
FIG. 9 is a perspective top view of the storage box 10 with a first lid 50a in an open configuration and a second lid 50b in a closed configuration, according to yet another alternate embodiment of the present invention; and, FIG. 10 is an environmental view of the storage box 10 partially inserted into a compartment 61 of a cab 60 of a tractor trailer, according to the preferred embodiment of the present invention.

Referring now to FIG. 9, there is shown yet another alternate embodiment of the storage box 10. A first lid 50a has a rear edge pivotally attached to a top edge of a first side of the rear wall 14 with a first hinge 56a. A second lid 50b has a rear edge pivotally attached to a top edge of a second side of the rear wall 14 with a second hinge 56b. The first lid 50a and second lid 50b fully cover the interior 25 when both are closed against the bottom of the storage box 10. The hinges 56a, 56b may be living hinges or piano hinges. The first hinge 56a biases the first lid 50a to be fully closed with respect to the storage box 10. Similarly, the second hinge 56a biases the second lid 50b to be fully closed with respect to the storage box 10. Torsion springs may also be utilized to bias the respective lids 50a, 50b closed. Along the front center perimeter edge of the first lid 50a is a first lid latch 51a that correspondingly aligns with and mates with a first lid catch 52a located on the front wall 13 adjacent the top edge thereof. Similarly, along the front center perimeter edge of the second lid 50b is a second lid latch 51b that correspondingly aligns with and mates with a second lid catch 52b located on the front wall 13 adjacent the top edge thereof. The latches 51a, 51b and catches 52a, 52b may enable a locking device to be secured thereto, thereby locking the respective lid 50a, 50b to the storage box 10 and prevent unauthorized access to the interior 25. The overall size of the combined first and second lids 50a, 50b may have a slightly larger perimeter than the bottom portion of the storage box 10 (i.e., the perimeter of the first sidewall 12a, second sidewall 12b, front wall 13, and rear wall 14) to enable either lid 50a, 50b to be grasped and manipulated. There also may be waterproof and weatherproof gasket located on the bottom perimeter of either lid 50a, 50b or the upper perimeter of the bottom of the storage box 10 (i.e., the first sidewall 12a, second sidewall 12b, front wall 13, and rear wall 14) to maintain a seal from items stored in the interior 25 from the elements.

The exemplary embodiment in FIG. 9 may also have least one (1) first lamp 40, each mounted to an interior surface of either or both the first lid 50a and second lid 50b. The first lamp 40 may be mounted in a position to best provide first illumination 41 to the interior 25 of the storage box 10. There may be multiple first lamps 40 as required to provide the desired first illumination 41. The first lamps 40 are in electrical communication with a power source and a switch (not shown). In some embodiments, the switch may be activated upon opening either lid 50a, 50b. Although not illustrates herein, it is appreciated that there is at least one (1) second lamp 45, each mounted to an exterior surface of storage box 10. The location of the second lamps 45, as well as the activation of the second illumination 46 thereof in the manner as described in the embodiment illustrated in FIG. 8, is also understood to fall under the scope of the invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A storage box, comprising:
   a generally rectangular unit having a first sidewall and a second sidewall, the first sidewall and the second sidewall are parallel to each other and are attached at a plurality of opposing bottom edges each with a bottom wall, the first sidewall and the second sidewall are attached at opposing rear edges with a rear wall, and the first sidewall and the second sidewall are attached at a plurality of opposing front edges with a front wall, each of the sidewalls has a handle located along a bisecting vertical centerline and adjacent top edges thereof;

one or more lids having a rear edge pivotally attached to a top edge of the rear wall with a hinge, the hinge biases the lid to be fully closed with respect to the storage box;

a torsion spring utilized to bias the lid closed;

a plurality of clips affixed to the inner surfaces of the front wall and the rear wall of the interior of the storage box;

a pair of rails each attached to the bottom wall and equidistantly spaced from a bisecting longitudinal centerline, the pair of rails are coextensive with the length of the bottom wall;

a plurality of bearings securely retained within a respective rail, the bearings are capable of independent rotation within the respective rail, the rails function as a race for the respective bearings such that the bearing rotate independently therein the respective rail, while being captured therein;

at least one first lamp each mounted to an interior surface of the lid, the at least first lamp is mounted in a position to provide first illumination to the interior of the storage box; and at least one second lamp each mounted to an exterior surface of the storage box, each of the at least one second lamp is mounted to provide second illumination away from the storage box.

2. The storage box according to claim 1, wherein the generally rectangular unit has a plurality of slightly rounded corners.

3. The storage box according to claim 1, wherein the handles are hinged into the respective sidewall.

4. The storage box according to claim 1, wherein the hinge is a living hinge.

5. The storage box according to claim 1, wherein the hinge is a piano hinge.

6. The storage box according to claim 1, wherein along a front center perimeter edge of the lid is a latch that correspondingly aligns with and mates with a catch located on the front wall adjacent the top edge thereof.

7. The storage box according to claim 6, wherein the latch and the catch enable a locking device to be secured thereto, thereby locking the lid to the storage box and prevent unauthorized access to the interior.

8. The storage box according to claim 1, wherein the lid includes a slightly larger perimeter than the bottom portion of the storage to enable the lid to be grasped and manipulated.

9. The storage box according to claim 1, further comprising a weatherproof gasket located on the bottom perimeter of the lid to maintain a seal from one or more items stored in the interior from the elements.

10. The storage box according to claim 1, wherein the clips are affixed to the inner surfaces of each sidewall.

11. The storage box according to claim 1, wherein the clips are a resilient spring clip capable of being slightly deformable.

12. The storage box according to claim 1, wherein the clips are provided in an aligned pair.

13. The storage box according to claim 1, wherein the aligned clips are capable of enabling a divider to be removably placed therein.

14. The storage box according to claim 13, wherein the divider is sized to span a distance between the inner surfaces of the sidewalls to span between inner surfaces of the front wall and the rear wall.

15. The storage box according to claim 1, wherein the rails are affixed to the bottom wall.

16. The storage box according to claim 1, wherein the bearings are a plurality of stainless ball bearings.

17. The storage box according to claim 1, wherein the bearings are a plurality of plastic spheres with low coefficient of friction.

18. The storage box according to claim 1, wherein the at least one second lamp is a red continuous light to alert that the storage box is present for safety purposes.

19. The storage box according to claim 1, wherein the at least one second lamp is a flashing light to alert that the storage box is present for safety purposes.

\* \* \* \* \*